Figure 1:
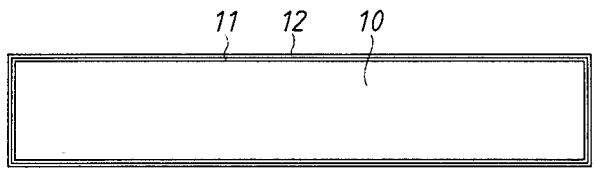

United States Patent [19]

Hermansson et al.

[11] Patent Number: 4,778,650

[45] Date of Patent: Oct. 18, 1988

[54] METHOD FOR THE MANUFACTURE OF AN OBJECT OF A POWDERED MATERIAL BY ISOSTATIC PRESSING

[75] Inventors: Leif Hermansson; Anna-Karin Tjernlund, both of Robertsfors, Sweden

[73] Assignee: ASEA Cerama AB, Robertsfors, Sweden

[21] Appl. No.: 155,552

[22] Filed: Feb. 12, 1988

[30] Foreign Application Priority Data

Mar. 2, 1987 [SE] Sweden .................... 87008595

[51] Int. Cl.$^4$ ............................. B22F 1/00
[52] U.S. Cl. ........................ 419/38; 419/39; 419/49; 264/65; 264/570
[58] Field of Search ............... 419/49, 38, 39; 264/65, 264/650

[56] References Cited

U.S. PATENT DOCUMENTS

| | | | |
|---|---|---|---|
| 4,446,100 | 5/1984 | Adlerborn et al. | 419/49 |
| 4,478,789 | 10/1984 | Adlerborn et al. | 419/49 |
| 4,568,516 | 2/1986 | Adlerborn et al. | 419/49 |
| 4,656,002 | 4/1987 | Lizenby et al. | 419/49 |
| 4,717,535 | 1/1988 | Adlerborn et al. | 419/49 |

*Primary Examiner*—Stephen J. Lechert, Jr.
*Attorney, Agent, or Firm*—Watson, Cole, Grindle & Watson

[57] ABSTRACT

In the manufacture of an object of a powdered material by isostatic pressing of a body (10) preformed from the powdered material with a gaseous pressure medium, the preformed body is provided with a casing (13) of glass which is made gas-impenetrable by heating before carrying out the isostatic pressing. Inside the glass casing there is arranged on the preformed body an intermediate layer (12) which counteracts the penetration of molten glass from the casing into the preformed body. The intermediate layer comprises a layer of one or more intermediate phases in the system $Al_2O_3$—$SiO_2$, for example mullite $3Al_2O_3 \cdot 2SiO_2$, or a layer containing one or more such intermediate phases as main constituent. In a preferred embodiment a layer of boron nitride is arranged inside the intermediate layer. In a preferred embodiment, the powdered object consists of aluminium oxide or an aluminium oxide-based ceramic.

10 Claims, 1 Drawing Sheet

METHOD FOR THE MANUFACTURE OF AN OBJECT OF A POWDERED MATERIAL BY ISOSTATIC PRESSING

The present invention relates to a method of manufacturing an object of a powdered material by isostatic pressing of a body preformed from the powdered material.

When the preformed body is subjected to the isostatic pressing at the sintering temperature, in order to give a desired dense, sintered product the body is enclosed within a casing which is capable of preventing the pressure medium thus used, normally a gas, from penetrating into the powder body. As casing there is then often used glass in the form of particles which may be applied on or around the preformed body in different ways. The preformed body with the applied casing is then heated, usually under vacuum, at such a temperature that the glass particles form a dense casing around the preformed body. When, later on during the isostatic pressing, the preformed body is subjected to pressure at an elevated temperature, problems may arise which are caused by the glass in the casing penetrating into pores in the preformed body and/or reacting with superficially located portions on the preformed body. To counteract such a process, an intermediate layer of a powdered material can be arranged on the preformed body inside the casing of glass. A well-known powdered material in such an intermediate layer is boron nitride. Boron nitride is suitable for this purpose because of its small propensity to react with the solid ceramic and metallic material which is used when manufacturing objects by isostatic pressing and because it is simple to remove since a layer of boron nitride is relatively soft and has relatively low strength. The function of the boron nitride as a barrier against the penetration of the glass, however, has proved to be unsatisfactory in those cases where there are great demands on the quality of the pressed and sintered end product. The reason is that a layer of boron nitride has a certain porosity and therefore cannot prevent sufficiently efficiently the occurrence of a certain passage of a low-viscous glass and the penetration of this glass into pores in the preformed body and/or the reaction of this glass at the surface of the body, so that the quality of the powder body is deteriorated by the presence of glass therein or by reaction products of glass and the material in the preformed body. It is also known to use, in intermediate layers with the described function, a finely-divided glass with a higher melting point than the glass in the casing or a finely-divided metallic material. However, such intermediate layers cannot sufficiently efficiently prevent the passage of a low-viscous glass and the disadvantages connected therewith.

According to the present invention, it has proved to be possible to provide a layer in which, when in use, damage to the formed object, caused by molten glass from the surrounding casing, is completely eliminated or reduced to a minimum. According to the invention, this is achieved by the use of a layer which at least substantially consists of mullite or another intermediate phase in the system $Al_2O_3$—$SiO_2$.

More particularly, the present invention relates to a method of manufacturing an object of a powdered material by isostatic pressing of a body preformed from the powdered material with a gaseous medium, wherein the preformed body is provided with a casing of glass or of a material forming glass when being heated, and an intermediate layer, which counteracts the penetration of glass in molten form from the casing into the preformed body, is arranged on the preformed body inside the casing and whereby the casing of glass is made gas-impermeable by heating, before the isostatic pressing, while sintering the preformed body, is carried out, characterized in that the intermediate layer comprises a layer of one or more intermediate phases in the system $Al_2O_3$—$SiO_2$ or a layer containing one or more such intermediate phases as main constituent. As examples of such intermediate phases may be mentioned mullite $3 Al_2O_3 \cdot 2 SiO_2$, sillimanite $Al_2O_3 \cdot SiO_2$ and kyanite $Al_2O_3 \cdot SiO_2$ (a high pressure modification of sillimanite). The intermediate layer is preferably used when manufacturing objects at temperatures below the melting temperature or the decomposition temperature of the intermediate phase or phases used in the intermediate layer.

A probable explanation of the good results obtained according to the present invention is that the above-mentioned intermediate phases only react very insignificantly with the surrounding glass. The mullite or other intermediate phase is in equilibrium with the surrounding glass and may, while maintaining its crystalline state, dissolve and take up some $SiO_2$ from the glass, which results in a slight sintering of the particles of the intermediate phase and hence in the intermediate layer functioning as a barrier against the penetration of glass into the preformed body located thereinside.

In addition to the above-mentioned intermediate phases, the intermediate layer may contain a powdered additive such as aluminium oxide, zirconium oxide, titanium diboride, boron nitride, or a high-melting glass which does not react, or only insignificantly reacts, with the intermediate phase, so that this in all essentials retains its crystalline state. Particularly suitable additives are such powdered materials which are used for the manufacture of the object. As examples of high-melting glass materials that may be used may be mentioned quartz glass and a glass containing 96.7 percent by weight $SiO_2$, 2.9 percent by weight $B_2O_3$ and 0.4 percent by weight $Al_2O_3$ (Vycor ®). The percentage of the additive may amount to almost 50%, and preferably to at most 30% of the total weight of all the constituents in the intermediate layer.

According to a particularly advantageous embodiment of the invention, there is arranged on the preformed body inside the intermediate layer a layer consisting at least substantially of boron nitride. In addition to its function of mechanically contributing to prevent a penetration of glass into the preformed body, the boron nitride constitutes an excellent release agent. This latter function has proved to be of particular importance when using the boron nitride inside an intermediate layer of mullite or other intermediate phase of the above-mentioned kind for the manufacture of objects of materials, among other things ceramics, having a high coefficient of thermal expansion. Upon cooling of the pressed object, and upon a shrinking thus occurring, the mullite or the corresponding intermediate phase functions as a coherent stiff shell around the object, thus protecting the object before the glass has solidified against viscous glass moving against the object. When the glass has solidified, because of the slight sintering previously described the mullite is fixedly secured to the glass, and therefore, under the cooperation of the boron nitride, the object is efficiently released from the glass casing and the intermediate layer. In certain applications it may be advantageous to arrange between the abovementioned layer, which at least for the main part consists of boron nitride, and the intermediate layer a layer consisting of a mixture of boron nitride and a high-melting glass such as the previously mentioned quartz glass or Vycor ® glass. The volume of the high-melting glass suitably amounts to 20–80% and preferably to 30–70% of the total volume of the glass and the boron nitride. The boron nitride may consist of boron nitride of commercially available qualities. Such qualitites contain a certain amount of oxygen in the form of boron oxide. The content of foreign substances in the boron nitride in layers, which at least substantially consist of boron nitride, preferably amounts to at most 10 percent by volume. Instead of using boron nitride, it is possible in some cases to use other substances with layer structures such as graphite and molybdenum sulphide.

The particle size of the material in the intermediate layer suitably amounts to 1–200 μm and preferably to less than 150 μm, of the boron nitride suitably to 1–100 μm and preferably to less than 45 μm, and of the high-melting glass suitably to 1–200 μm and preferably to less than 125 μm.

The thickness of the intermediate layer suitably amounts to 0.1–3 mm and preferably to 0.3–0.6 mm, the thickness of the layer of boron nitride suitably to 0.1–2 mm and preferably to 0.2–0.4 mm, and the thickness of the layer of a mixture of boron nitride and high-melting glass to 0.1–3 mm and preferably to 0.3–0.6 mm.

The layer of boron nitride and the layer of one or more intermediate phases of the system $Al_2O_3$—$SiO_2$ may be brought about by immersing the preformed body into or spraying it with a suspension of those particles from which the respective layer is to consist, in a solvent, for example acetone, ethanol or other alcohol, followed by a drying of the preformed body.

The powdered material of which the object is manufactured preferably constitutes a ceramic material or a metallic material. As examples of ceramic materials for which the present invention is particularly suited for use may be mentioned aluminium oxide and aluminium oxide-based ceramics, for example the systems $Al_2O_3$—SiC and $Al_2O_3$—$ZrO_2$ and zirconium oxide and zirconium-oxide-based ceramics. These ceramic materials have a greater coefficient of thermal expansion than usable glass materials, which causes them—for reasons previously mentioned—to become effectively released from the glass casing. Another extremely important property of the intermediate layer when using it for the manufacture of aluminium oxide and aluminium-oxide-based ceramics is that the intermediate phase in the intermediate layer is in chemical equilibrium with $Al_2O_3$ and does not take up any $Al_2O_3$ from the object. As examples of other ceramic materials for which the invention is applicable may be mentioned silicon carbide, boron carbide, titanium diboride and silicon nitride.

As examples of metallic materials may be mentioned, inter alia, steel, an iron-based alloy, for example 3% Cr-Mo steel containing 0.33% C, 0.30% Si, 0.40% Mn, 0.01% P, 0.01% S, 2.8% Cr, 0.6% Mo, the balance being Fe, or 12% Cr-Mo-V-Nb steel containing 0.18% C, 0.25% Si, 0.60% Mn, 0.01% P, 0.01% S, 11.5% Cr, 0.5% Ni, 0.5% Mo, 0.30% V, 0.25% Nb, the balance being Fe, or an alloy containing 1.27% C, 0.3% Si, 0.3% Mn, 6.4% W, 5.0% Mo, 3.1% V, 4.2% Cr, the balance being Fe, or of a nickel-based alloy, for example an alloy containing 0.03% C, 15% Cr, 17% Co, 5% Mo, 3.5% Ti, 4.4% Al, 0.03% B, the balance being Ni, or an alloy containing 0.06% C, 12% Cr, 17% C, 3% Mo, 0.06% Zr, 4.7% Ti, 5.3% Al, 0.014% B, 1.0% V, the balance being Ni. The percentage here relates to percentage by weight.

As examples of usable materials in glass in the casing around the preformed body may be mentioned a glass containing 80.3 percent by weight $SiO_2$, 12.2 percent by weight Bhd $2O_3$, 2.8 percent by weight $Al_2O_3$, 4.0 percent by weight $Na_2O$, 0.4 percent by weight $K_2O$, and 0.3 percent by weight CaO (Pyrex ®), further an aluminium silicate containing 58 percent by weight $SiO_2$, 9 percent by weight $B_2O_3$, 20 percent by weight $Al_2O_3$, 5 percent by weight CaO and 8 percent by weight MgO, as well as mixtures of particles of substances, for example $SiO_2$, $B_2O_3$ and alkaline and alkaline earth metal oxides which, upon heating, form glass, further a glass containing 96.7 percent by weight $SiO_2$, 2.9 percent by weight $B_2O_3$ and 0.4 percent by weight $Al_2O_3$ (Vycor ®) and mixtures of particles which, upon heating, form glass.

The pressure and temperature for the isostatic pressing and the sintering of a ceramic or metallic material are, of course, dependent on the type of this material. Normally, however, the pressure should amount to at least 100 MPa and the temperature amount to 1000°–1900° C., preferably to at most 1800° C.

Figure 2:
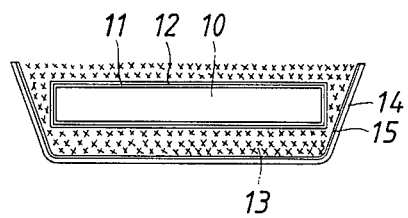
Figure 3:
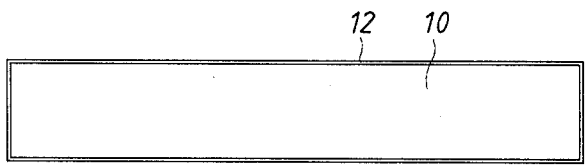
Figure 4:
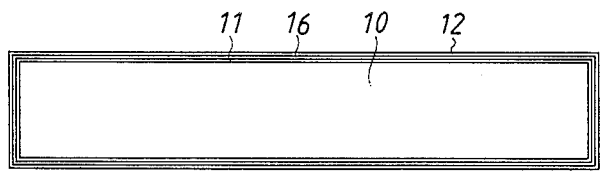

The invention will be explained in greater detail, by way of examples, with reference to the accompanying drawing, wherein FIG. 1 schematically shows a preformed body provided with intermediate layers according to the present invention, FIG. 2 shows the same body on a reduced scale in a glass casing, and FIGS. 3 and 4 show other preformed bodies provided with intermediate layers according to the present invention.

EXAMPLE 1

Aluminium oxide having a particle size of 0.1–2 μm is placed in a capsule of plastic, for example softened polyvinyl chloride or rubber having approximately the same shape as the preformed body to be manufactured. The capsule is sealed and the capsule with its contents is subjected to a compaction at 300 MPa for a period of 5 minutes at room temperature. After completed compaction the capsule is removed, and the body thus manufactured is machined into the desired shape.

The preformed powder body 10 thus obtained, shown in FIG. 1, has a cylindrical shape. On it there are applied first a layer 11 of boron nitride and on top of this layer a layer 12 of mullite. These layers are drawn in greatly exaggerated thickness. For the application of the layer 11 there is used a suspension containing 40 percent by weight boron nitride with a particle size of less than 45 μm, 3 percent by weight polymethyl methacrylate, and 57 percent by weight acetone. The suspension is sprayed on the body so that all surfaces are covered with a layer of the suspension. When the acetone has evaporated, the layer has a thickness of 0.2 mm. Thereafter there is applied, similarly by spraying, a layer 12 of a suspension containing 45 percent by weight mullite with a particle size of less than 150 μm, 5 percent by weight butyl acrylate, and 50 percent by weight isopropanole. After drying the layer 12 has a thickness of 0.4 mm.

The preformed body 10 with the applied boron nitride layer 11 and the intermediate layer 12 of mullite is provided, according to FIG. 2, with a casing 13 of glass in the form of a mass of glass particles arranged in a graphite crucible 14, which is internally provided with a release layer 15 of boron nitride. The glass in this mass consists of 80.3 percent by weight $SiO_2$, 12.2 percent by weight $B_2O_3$, 8.2 percent by weight $Al_2O_3$, 4.0 percent by weight $Na_2O$, 0.4 percent by weight $K_2O$, and 0.3 percent by weight CaO. The crucible with its contents is placed in a furnace in which the binders in the layers 11 and 12, i.e. the acrylates, are driven off in vacuum while the temperature is successively raised to 400° C. and is maintained at this temperature for a few hours. Thereafter, the crucible with its contents is placed in a high pressure furnace in which the necessary pressure can be generated by the supply of a gas, for example argon, and the necessary temperature can be obtained by conventional heating devices.

First the crucible is heated to a temperature of 1000°-1200° C. at atmospheric pressure so that the glass casing forms a melt and becomes gas-impenetrable. Thereafter, the pressure is raised to 150 MPa and the temperature to 1350°-1400° C. and are maintained under these conditions for a period of 1 hour. The aluminium oxide will then sinter while forming a body with a density of 99.9% of the theoretical. When the body has been allowed to cool and the glass casing has been removed, the barrier layers 11 and 12 can be removed without difficulty by light sand blasting.

EXAMPLE 2

The same procedure as described in Example 1 is used to manufacture an object of aluminium oxide, with the difference that no layer of boron nitride is used but that the intermediate layer 12 of mullite is applied direct on the preformed body 10, as shown in FIG. 3, and that the isostatic pressing of the body 10 with the layer 12 arranged in the glass casing 13 in the crucible 14 is carried out at a temperature of 1200°-1300° C.

EXAMPLE 3

The same procedure as described in Example 1 is used to manufacture an object of zirconium dioxide with a particle size of less than 1 μm.

EXAMPLE 4

The same procedure as described in Example 1 is used to manufacture an object of an aluminium oxide-based ceramic consisting of 75 percent by weight aluminium oxide and 25 percent by weight silicon carbide as whiskers, the isostatic pressing, however, being carried out at a temperature of 1500°-1650° C.

EXAMPLE 5

The same procedure as described in Example 1 is used to manufacture an object of titanium diboride with a particle size of less than 3 μm, the isostatic pressing, however, being carried out at a temperature of about 1500° C.

EXAMPLE 6

The same procedure as described in Example 1 is used to manufacture an object of silicon nitride (containing 2.5 percent by weight yttrium oxide) with a particle size of less than 1 μm, the isostatic pressing, however, being carrried out at a temperature of about 1700° C.

EXAMPLE 7

The same procedure as described in Example 1 is used to manufacture an object of a 12% Cr-Mo-V-Nb steel containing 0.18% C, 0.25% Si, 0.60% Mn, 0.091% P, 0.01% S, 11.5% Cr, 0.5% Ni, 0.5% Mo, 0.30% V, 0.25% Nb, the balance being Fe, and having a grain size of less than 800 μm. In this case the isostatic pressing is carried out at a temperature of 1200° C.

EXAMPLE 8

The same procedure as described in Example 1 is used to manufacture an object of boron carbide with the difference that outside the layer 11 there is applied, as illustrated in FIG. 4, a layer 16 consisting of a mixture of Vycor ® glass and boron nitride and outside this layer 16 there is applied a layer 12 of mullite, the isostatic pressing, however, being carried out at a temperature of about 1750° C. For the application of the layer 16 there is used a suspension containing 20 percent by weight Vycor ® glass with a particle size of less than 125 um, 18 percent by weight boron nitride with a particle size of less than 45 um, 3 percent by weight butyl acrylate and 59 percent by weight isopropanole. After drying the layer has a thickness of 0.4 mm. For the application of the layer 12 there is used in this case a suspension containing 45 percent by weight mullite with a particle size of less than 70 μm, 3 percent by weight polymethyl methacrylate and 52 percent by weight acetone. The thickness of the layer is 0.4 mm after drying.

EXAMPLE 9

The same procedure as described in Example 8 is used to manufacture an object of $Al_2O_3$ with 25 percent by weight SiC whiskers, the isostatic pressing, however, being carried out at a temperature of 1500°-1650° C.

Instead of using mullite in the examples described, there may be used, as intermediate layer, sillimanite or kyanite, or mixtures of at least two of them in arbitrary proportions. Further, it is possible to add to these intermediate phases, or mixtures thereof in the cases illustrated in the examples, the previously mentioned additives, such as $Al_2O_3$, $ZrO_2$ or $TiB_2$ in a content of 10% of the total weight of all constituents in the intermediate layer.

We claim:

1. A method of manufacturing an object of a powdered material by isostatic pressing of a body (10) preformed from the powdered material with a gaseous pressure medium, the preformed body being provided with a casing (13) of glass or of a material forming glass upon heating, an intermediate layer (12) of a powdered material, which counteracts the penetration of glass in molten form from the casing in the preformed body, being arranged on the preformed body inside the casing, the casing of glass being made gas-impenetrable by heating, before the isostatic pressing is carried out while sintering the preformed body, characterized in that the intermediate layer comprises a layer of one or more intermediate phases in the system $Al_2O_3$—$SiO_2$, or a layer containing one or more such intermediate phases as main constituent.

2. A method according to claim 1, characterized in that the intermediate phase or phases consist(s) of one or more of the substances mullite 3 $Al_2O_3$ . 2 $SiO_2$, sillimanite $Al_2O_3$. $SiO_2$, or kyanite $Al_2O_3$. $SiO_2$.

3. A method according to claim 1, characterized in that the intermediate layer is used at temperatures below the melting temperature or decomposition temperature of the intermediate phase or phases.

4. A method according to claim 1, characterized in that on the preformed body inside the intermediate layer there is arranged a layer which at least for the main part consists of boron nitride.

5. A method according to claim 1, characterized in that on the preformed body inside the intermediate layer there is arranged a layer which at least for the main part consists of graphite or molybdenum sulphide.

6. A method according to claim 4, characterized in that the intermediate layer contains a powdered additive, such as aluminum oxide, zirconium oxide, titanium boride, boron nitride, or quartz glass, which does not react, or only insignificantly reacts, with the intermediate phase.

7. A method according to claim 4, characterized in that between the intermediate layer and the layer of boron nitride arranged inside the intermediate layer there is arranged a layer consisting of a mixture of boron nitride and a high-melting glass.

8. A method according to claim 1, characterized in that the powdered material in the object consists of aluminum oxide or an aluminum oxide-based ceramic.

9. A method according to claim 1, charcterized in that the powdered material in the object consists of zirconium oxide-based ceramic.

10. A method according to claim 1, characterized in that the powdered material in the object consists of titanium diboride or a titanium diboride-based ceramic.

* * * * *